United States Patent
Kraemer et al.

(10) Patent No.: US 7,477,980 B2
(45) Date of Patent: Jan. 13, 2009

(54) PROCESS CONTROL SYSTEM

(75) Inventors: Gerd Kraemer, Baierbrunn (DE); Heiko Konrad, Baierbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 312 days.

(21) Appl. No.: 11/514,078

(22) Filed: Sep. 1, 2006

(65) Prior Publication Data

US 2007/0203588 A1     Aug. 30, 2007

Related U.S. Application Data

(63) Continuation of application No. PCT/EP2005/002257, filed on Mar. 3, 2005.

(30) Foreign Application Priority Data

Mar. 4, 2004   (DE)  ............... 10 2004 011 236

(51) Int. Cl.
    *G06F 19/00*     (2006.01)
    *G05B 13/02*     (2006.01)
(52) U.S. Cl. ........................................ 701/102; 700/29
(58) Field of Classification Search ............... 701/22, 701/48, 51, 101–103, 110, 111, 114, 115; 700/29, 30, 90, 97; 702/32, 33, 41, 189; 706/2, 903, 905, 906; 123/480, 486, 488
See application file for complete search history.

(56) References Cited

U.S. PATENT DOCUMENTS

| | | | | |
|---|---|---|---|---|
| 5,094,213 A | * | 3/1992 | Dudek et al. | 123/478 |
| 5,526,281 A | * | 6/1996 | Chapman et al. | 702/22 |
| 5,729,462 A | * | 3/1998 | Newkirk et al. | 700/97 |
| 5,735,584 A | * | 4/1998 | Eckert | 701/70 |
| 6,321,156 B1 | * | 11/2001 | Kraemer | 701/102 |
| 6,671,610 B2 | * | 12/2003 | Rekewitz et al. | 701/102 |
| 6,859,739 B2 | * | 2/2005 | Wegerich et al. | 702/32 |
| 6,871,632 B2 | | 3/2005 | Henn et al. | |

FOREIGN PATENT DOCUMENTS

| DE | 102 24 213 C1 | 10/2003 |
|---|---|---|
| DE | 102 27 466 A1 | 1/2004 |

\* cited by examiner

*Primary Examiner*—Willis R Wolfe, Jr.
(74) *Attorney, Agent, or Firm*—Crowell & Moring LLP

(57) ABSTRACT

A process control system for controlling at least one process actuator includes a first process model for driving at least one process actuator in such a manner that at least one process desired manipulating variable is generated for driving at least one process actuator; a second process model, which generates a process actual variable from at least one process actual manipulating variable of the at least one process actuator; and another process element for generating a comparison process actual variable. The first process model can be mapped by inverting the second process model, and a process actual variable difference, which is formed from a process actual variable and a comparison process actual variable, is fed via a control unit to the first and second process models. The process element is designed as a third process model with higher reproduction precision and includes at least one non-invertible process component.

16 Claims, 3 Drawing Sheets

PROCESS CONTROL SYSTEM

CROSS REFERENCE TO RELATED APPLICATIONS

This application is a continuation of PCT International Application No. PCT/EP2005/002257, filed Mar. 3, 2005, which claims priority under 35 U.S.C. § 119 to German Patent Application No. 10 2004 011 236.3, filed Mar. 4, 2004, the entire disclosures of which are herein expressly incorporated by reference.

BACKGROUND AND SUMMARY OF THE INVENTION

The present invention relates to a process control system.

FIG. 1 illustrates a process control system in which a process is implemented by a process model or individual process submodels. For example, the process may include the filling of a combustion chamber of an internal combustion engine with a desired mixture of air and gas. Based on a desired filling specified by the driver, the desired manipulating variables for driving individual load actuators are determined by a first process model component PM1, for example, in the form of a load control.

The actual filling of the combustion chamber is calculated by a second process model PM2 in the form of a load determination, which is based on the process-determined actual manipulating variables of the load actuators. Parallel to the calculation of this actual filling, the actual filling is measured via sensors, for example, an HFM sensor. The measured and the calculated actual filling are then compared. The difference between the actual fillings is fed to a mass flow regulator, which in turn influences the two process models via its output signal. Since one model must be invertible for observing a process, the process models PM1 and PM2 must be invertible. Thus, PM1 must be invertible into PM2 and vice versa. To guarantee this invertability at any time, only such process models are employed that are very simplified and, therefore, usually also very inaccurate.

The present invention provides a solution to the above-described problem by providing a process control system exhibiting higher precision.

A process control system according to the invention includes a first process model for driving at least one process actuator in such a manner that, from at least one process desired variable fed to the first process model, at least one process desired manipulating variable is generated for driving at least one process actuator. Furthermore, there is a second process model, which generates a process actual variable from at least one process actual manipulating variable of the at least one process actuator. Therefore, the first process model can be mapped (transferred into the second process model) by inverting the second process model. Furthermore, according to the invention, a third process model generates a comparison process actual variable, which is substantially equivalent to the process actual variable generated by the second process model. The third process model may have a distinctly higher precision and exhibit at least one non-invertible component in such a manner that the third process model cannot be converted in its entirety through inversion into the first process model. Furthermore, a process actual variable difference may be formed from the process actual variable and the comparison process actual variable. The difference is fed via a first control unit back to the first and the second process models.

In an exemplary embodiment of the invention, there is a device for measuring a comparison process actual variable. In so doing, an additional process actual variable difference, formed from the measured comparison process actual variable and the process actual variable and determined via the third process model, is fed via another control unit back to the third process model.

An exemplary embodiment of the invention includes determining the load and controlling the load for the combustion engine of a motor vehicle.

The exact knowledge of the air mass flowing into the combustion chambers of the cylinders per working cycle, which is also called the load, is very important for controlling internal combustion engines. The calculation of the injection period for the fuel and the calculation of the ignition point for the mixture of air and fuel in the combustion chamber are carried out based on the load. When regulating and/or controlling the process, any inaccuracies in the load signal usually result in a disadvantageous behavior of the emissions, drivability and consumption.

A direct determination of the air mass flow at the intake valve, which is mandatory for controlling and/or regulating the process, is not possible for technical reasons. Thus, accurate models for calculating the air mass flow ratios at the intake valve are necessary for controlling and/or regulating internal combustion engines. This is done, for example, on the basis of pressure sensors, mass flow sensors at the intake to the suction system (e.g., HFM sensors) or with the aid of actual variables of the actuators (e.g., throttle flap). This model-based calculation of the load is called load determination. In addition to the load determination, a load control may be implemented in the control of the internal combustion engine. To this end, the load setpoint, which is the result of the driver's momentary wish, is converted into the setpoints for the load actuators. In an engine with adjustable valve lift and/or adjustable valve timing (e.g., a Valvetronic engine), the suitable load setpoints to be calculated (load determination) are the following variables: throttle flap setting, intake valve lift, exhaust valve lift, intake timing, and exhaust timing.

Even for load control, the calculation models, in which the connection between the load and the positions or the values of the load actuators are mapped, must be put in the control/regulation. A fundamental difference between the two control functions (load control and load determination) to be reproduced by process models lies in the demands put on the respective air mass models. On the one hand, the process model that is used for load determination ought to map the process to be reproduced as accurately as possible. Since an invertability is not absolutely necessary for load determination, yet higher accuracy is desired, a process model that is not invertible in its entirety is used to this end. Therefore, a first process model for load determination is designed so as to be invertible in order to infer by inversion the process model for the precontrol (load control). A second process model for load determination is designed to be non-invertible to achieve higher accuracy for the load determination, if necessary.

On the other hand, the process model used for load control ought to be invertible, because the actuation of the load actuators must be based on the inverted air mass model. The use of an inverted or invertible process model in the precontrol (load control) guarantees that at stationary operating points the load setpoints and the load actual values are equal, and thus, the functioning of the so-called torque structure of the control is guaranteed.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE DRAWINGS

Figure 1:
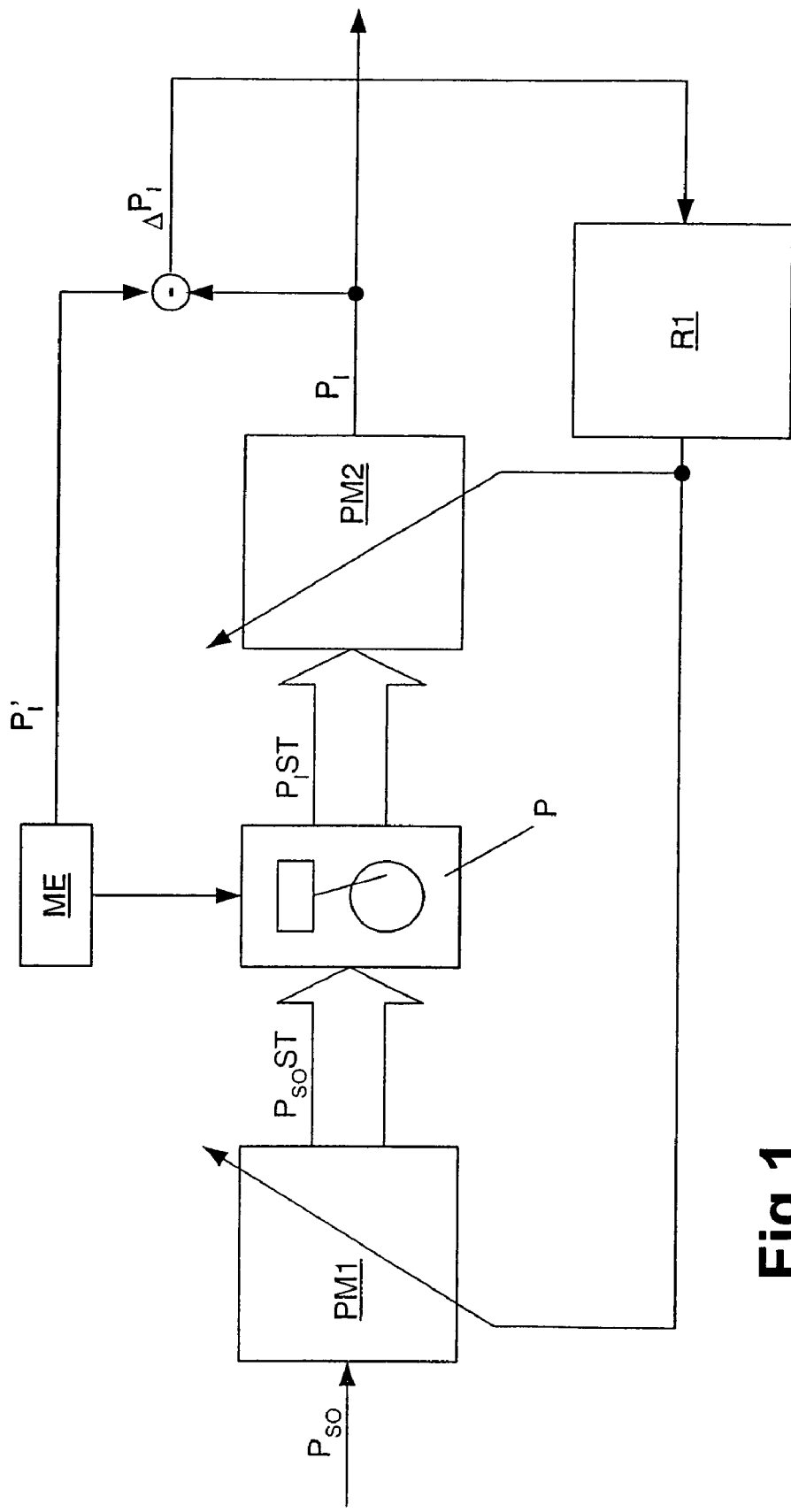
FIG. 1 is a schematic drawing of a process control system, according to the related art.
Figure 2:
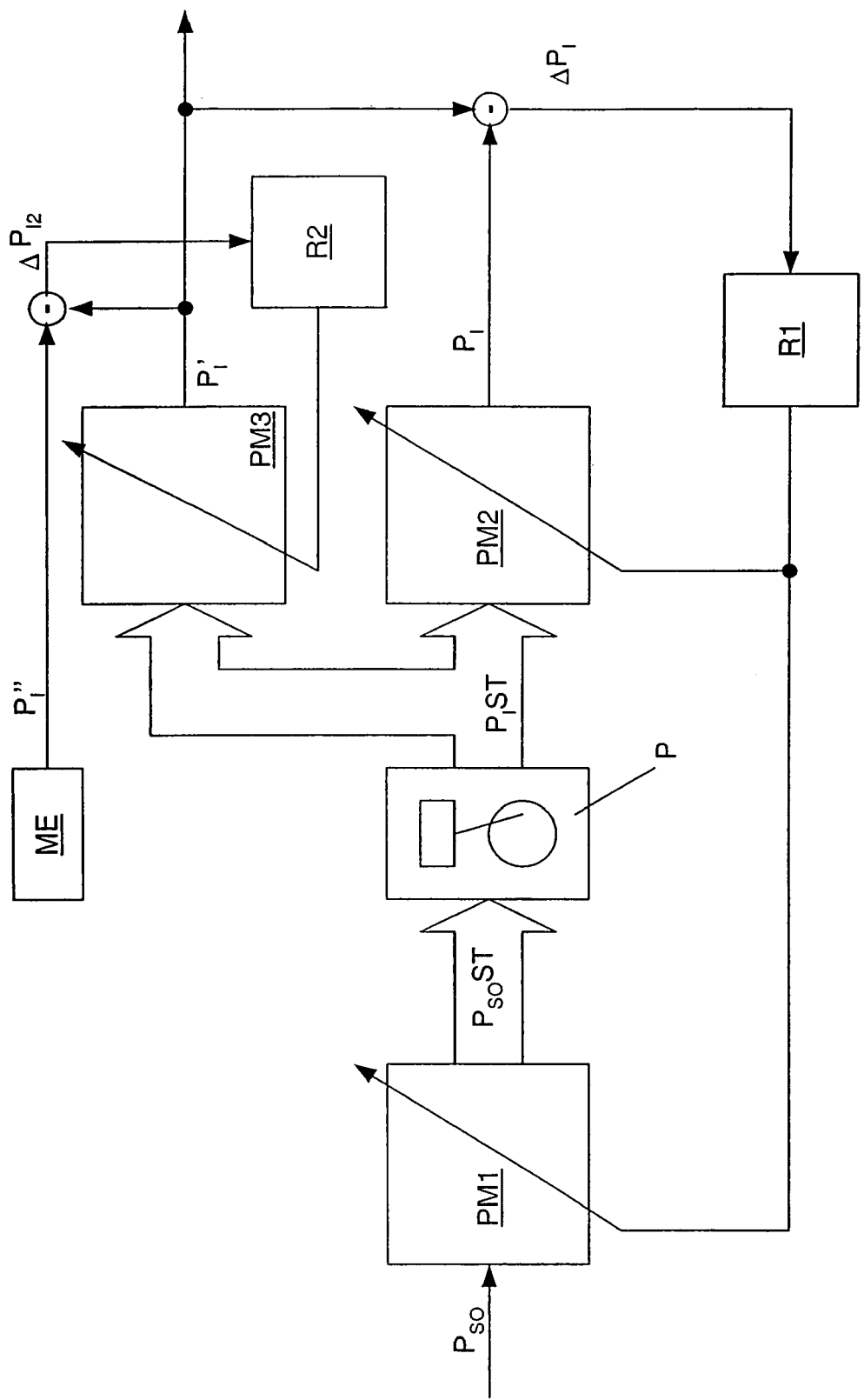
FIG. 2 is a schematic drawing of a process control system, according to the invention.

FIG. 2 depicts a process control system, according to the invention, including a first process model PM1 for precontrol of a process P, a second invertible process model PM2 (inverted precontrol) for controlling the process, a third non-invertible process model PM3 for very precise reproduction of the process to be controlled, and a first control unit R1, which generates from a difference in actual values, which are generated from the process models PM2 and PM3 for controlling the process, a manipulating variable to be fed back to the invertible process models PM1 and PM2. In this way a simple process model (invertible process model) is combined with a process model (non-invertible process model) that is as accurate as possible and, thus, fulfills, on the one hand, the demand for invertability of the process to be controlled, and, on the other hand, the demand for a sufficiently accurate reproduction of the process to be controlled.

In another exemplary embodiment of the invention, there is not only the model-based reproduction of the process actual value by the non-invertible process model PM3, but also a quasi-stationary measurement of the desired process actual value by a measurement device ME. The process actual value, determined via the non-invertible process model, is compared with this desired process actual value. The comparison difference is fed back via a second control unit R2 to the non-invertible process model PM3.

Figure 3:
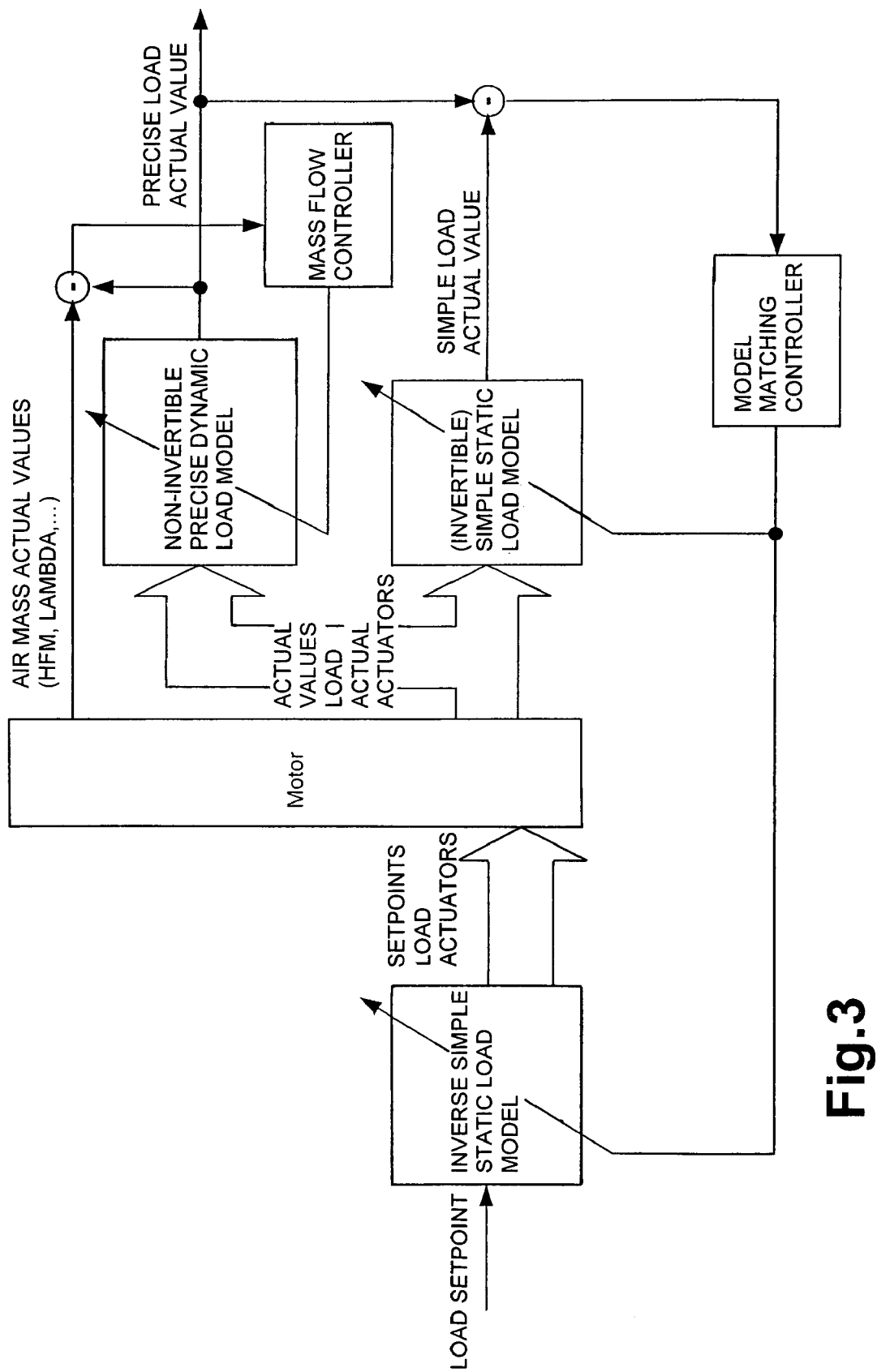
FIG. 3 depicts an exemplary embodiment of an inventive process control system for filling the combustion chamber of a motor vehicle.

FIG. 3 shows the inventive process control system analogous to FIG. 2 and its application using the process P for filling the combustion chamber of a cylinder of an internal combustion engine as an example.

For the air mass precontrol (load control) a simple (invertible) process model PM1, PM2 is used here. Its main component is a load mapping, wherein a process actual value of the load signal is stretched over the actual value of the intake valve lift and the engine speed (lift input-output map). The process actual value, which is put into the load map (load value P1), is valid at any map point only for precisely one reference combination of the valve intake and the valve exhaust timing. If the valve intake and/or the valve exhaust timing deviates from this reference combination, the process model is adapted to this deviation. The load map is applied in such a manner that the load signal always rises monotonically with the setpoint of the intake valve lift. Thus, with the use of the simple static model, a map for the input-output map of the intake valve lift that is the exact inverse of the simple static load model can be calculated by a simple inversion of the map. Therefore, this lift input-output map has, as the input variables, the setpoint of the load and the engine speed and, as the output variables, the setpoint for the intake valve lift.

The calculation of the air mass (load determination) that actually flows into the cylinders of the internal combustion engine may be carried out, according to the invention, with the aid of a very precise (non-invertible) dynamic process model PM3. The precise process model PM3 may include submodels for at least the essential components of the suction system that influence the filling of a cylinder combustion chamber. In particular, the precise process model PM3 (seen in the flow direction of the air) may include an air filter model for reproducing the air mass flow in the air filter unit, a throttle flap model for reproducing the air mass flow in the area upstream and downstream of the throttle flap, a container model for the suction pipe for reproducing the air mass flow in the suction pipe, and an intake valve model for reproducing the air mass flow in the area of the intake valve.

A factor for the precise dynamic process model is that the air mass flows, which flow in over the throttle flap and flow out over the intake valves, are modeled. The throttle flap mass flow follows from the pressure ratio over the throttle flap and the current actual value of the throttle flap angle. The mass flow over the intake valve may be modeled as a function of the suction pipe pressure, the exhaust gas pressure, as well as the actual values of the intake valve lift, the intake timing and the exhaust timing. To this end a nonlinear static model may be used that maps the mass flow as a function of the input variables (absorption characteristics). The pressure change in the suction pipe may be modeled by balancing the throttle flap and intake valve mass flow and by applying the gas equation. The absolute value of the suction pipe pressure may be calculated through integration. The absolute value may become the input variable again for modeling the mass flow at the throttle flap and the intake valve.

The precise dynamic process model PM3 and the simple static process model PM2 are matched via model matching. The matching may be carried out by a control unit R1 in the form of a model matching controller, which may be designed as a PI controller. The input variable of the model matching controller is the difference between the precise dynamic process model PM3 and the static process model PM2. The output variable of the mass flow controller is an error-correction variable, with which the simple static process model PM1, PM2 is adapted. This correction of the simple static process model PM1, PM2 may be carried out in the precontrol (process model PM1) and in the inverted path (process model PM2), so that the simple static process model PM2 remains invertible even despite the model matching.

The model matching may be carried out so slowly that dynamic effects, which are mapped in the dynamic precise process model PM3, but which might not be considered in the simple static process model PM2 are not ruled out. Instead, only the stationary values of the two process models PM3 and PM2/PM1 are matched. Following completion of the model matching, the load of the simple static process model PM2 is equivalent to that of the dynamic precise process model PM3. In addition, the load setpoints and the load actual values are identical owing to the still existing inversion of the simple static process model.

Despite the very high accuracy of the precise dynamic process model PM3, model errors still occur with respect to the air mass that actually flows into the cylinder. Accordingly, an exemplary embodiment of the invention provides that the air mass that actually flows in is measured quasi-stationarily very precisely by a measuring device ME, e.g., by an HFM sensor at the suction pipe intake or by a lambda probe in the exhaust tract, and is used for matching the precise dynamic model. The matching is carried out by another control unit R2, e.g., a mass flow controller, which may also be designed as a PI controller and with an additional adaptive neuronal network. The input variable of the mass flow controller is the difference between the real air mass and the model air mass flow from the precise dynamic process model PM3. The output variable of the mass flow controller is an error-correction variable, with which the precise dynamic process model PM3 is adapted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process control system for controlling at least one process actuator, the process control system comprising:
   a first process model for driving the at least one process actuator in such a manner that, from at least one process desired variable fed to the first process model, at least one process desired manipulating variable is generated for driving the at least one process actuator;
   a second process model which generates a process actual variable from at least one process actual manipulating variable of the at least one process actuator; and
   a process element for generating a comparison process actual variable;
   wherein the first process model can be mapped by inverting the second process model;
   wherein a process actual variable difference which is formed from the process actual variable and the comparison process actual variable is fed via a control unit to the first and the second process model; and
   wherein the process element is configured as a third process model with higher process reproduction precision than the first and second process models, and includes at least one non-invertible process component.

2. The process control system, as claimed in claim 1, further comprising:
   a measuring device configured to measure the comparison process actual variable, whereby an additional process actual variable difference formed from the measured comparison process actual variable and the comparison process actual variable and determined via the third process model is fed via another control unit to the third process model.

3. The process control system, as claimed in claim 2, wherein the third process model comprises a plurality of individual process submodels including an air filter model for reproducing an air mass flow in an area of an air filter unit, a throttle flap model for reproducing an air mass flow in an area of a throttle flap arrangement, a suction pipe container model for reproducing pressure ratios inside a suction pipe and an intake valve model for reproducing an intake valve air mass flow in an area of an intake valve arrangement.

4. The process control system, as claimed in claim 1, wherein the third process model comprises a plurality of individual process submodels including an air filter model for reproducing an air mass flow in an area of an air filter unit, a throttle flap model for reproducing an air mass flow in an area of a throttle flap arrangement, a suction pipe container model for reproducing pressure ratios inside a suction pipe and an intake valve model for reproducing an intake valve air mass flow in an area of an intake valve arrangement.

5. The process control system, as claimed in claim 4, wherein the throttle flap model generates the air mass flow in the area of the throttle flap arrangement based on determined variables of at least a current pressure ratio over the throttle flap and an associated throttle flap angle.

6. The process control system, as claimed in claim 5, wherein the intake valve model generates the air mass flow in the area of the intake valve based on determined variables of at least a suction pipe pressure, an exhaust gas counter pressure, an actual value of an intake valve lift, an actual value of an intake timing and an actual value of the exhaust timing.

7. The process control system, as claimed in claim 4, wherein the intake valve model generates the air mass flow in the area of the intake valve based on determined variables of at least a suction pipe pressure, an exhaust gas counter pressure, an actual value of an intake valve lift, an actual value of an intake timing and an actual value of the exhaust timing.

8. The process control system, as claimed in claim 7, wherein the intake valve model for generating the air mass flow in the area of the intake valve comprises nonlinear absorption characteristics.

9. A method for controlling at least one process actuator, comprising the acts of:
   generating at least one process desired manipulating variable from at least one process desired variable fed into a first process model;
   driving the at least one process actuator, based on the at least one process desired manipulating variable;
   generating, in a second process model, a process actual variable from at least one process actual manipulating variable of the at least one process actuator;
   generating a comparison process actual variable in a process element;
   mapping the first process model by inverting the second process model; and
   inputting, via a control unit, a process actual variable difference which is formed from the process actual variable and the comparison process actual variable, to the first and second process models;
   wherein the process element is configured as a third process model with higher process reproduction precision than the first and second process models, and includes at least one non-invertible process component.

10. The method as claimed in claim 9, further comprising the acts of:
    measuring the comparison process actual variable; and
    inputting to the third process model, via another control unit, an additional process actual variable difference formed from the measured comparison process actual variable and the comparison process actual variable and determined via the third process model.

11. The method as claimed in claim 10, wherein the third process model comprises a plurality of individual process submodels including an air filter model for reproducing an air mass flow in an area of an air filter unit, a throttle flap model for reproducing an air mass flow in an area of a throttle flap arrangement, a suction pipe container model for reproducing pressure ratios inside a suction pipe and an intake valve model for reproducing an intake valve air mass flow in an area of an intake valve arrangement.

12. The method as claimed in claim 9, wherein the third process model comprises a plurality of individual process submodels including an air filter model for reproducing an air mass flow in an area of an air filter unit, a throttle flap model for reproducing an air mass flow in an area of a throttle flap arrangement, a suction pipe container model for reproducing pressure ratios inside a suction pipe and an intake valve model for reproducing an intake valve air mass flow in an area of an intake valve arrangement.

13. The method as claimed in claim 12, wherein the throttle flap model generates the air mass flow in the area of the throttle flap arrangement based on using determined variables of at least a current pressure ratio over the throttle flap and an associated throttle flap angle.

14. The method as claimed in claim 12, futher comprising the act of:
   measuring the comparison process actual variable; and
   inputting to the third process model, via another control unit, an additional process actual variable difference formed from the measured comparison process actual variable and the comparison process actual variable and determined via the process model.

15. The method as claimed in claim 12, wherein the intake valve model generates the air mass flow in the area of the intake valve using determined variables of at least a suction pipe pressure, an exhaust gas counter pressure, an actual value of an intake valve lift, an actual value of an intake timing and an actual value of the exhaust timing.

16. The method as claimed in claim 15, wherein the intake valve model for generating the air mass flow in the area of the intake valve comprises nonlinear absorption characteristics.

* * * * *